H. DE F. ARNOLD.
THERMIONIC DETECTOR.
APPLICATION FILED JUNE 8, 1914.
1,128,280.
Patented Feb. 16, 1915.
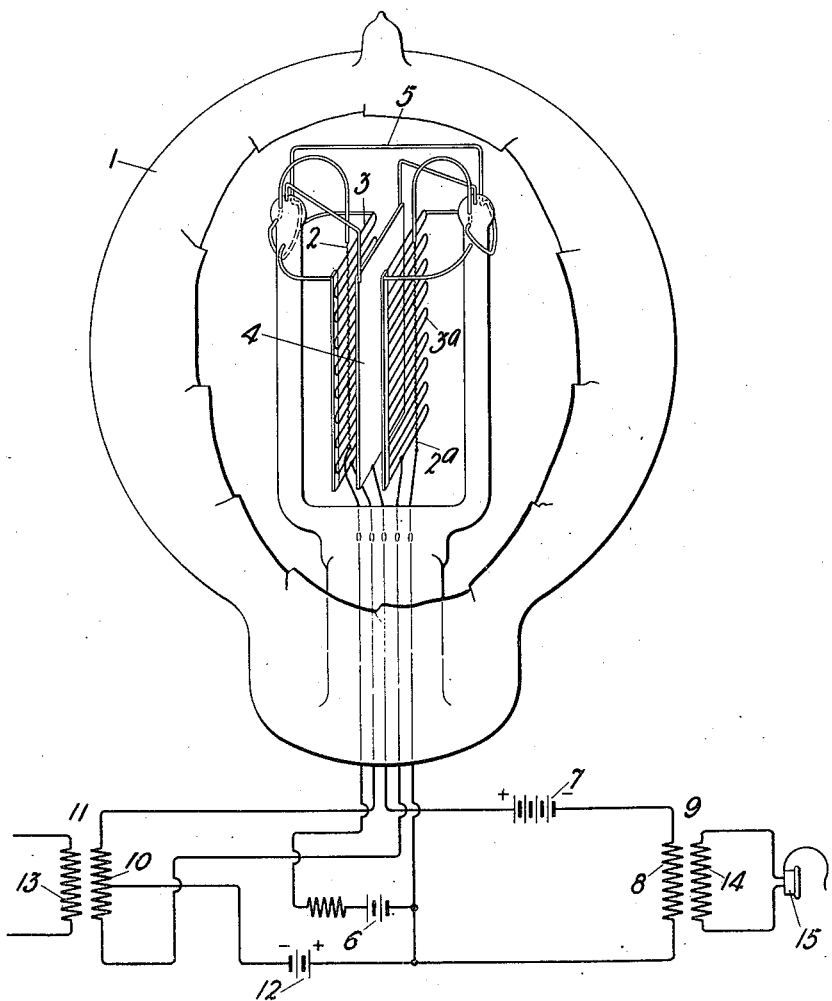
Witnesses:
O. B. M. Guthe
E. Edler
Inventor:
Harold D. Arnold
by S. E. Manne,
Atty

UNITED STATES PATENT OFFICE.

HAROLD DE FOREST ARNOLD, OF EAST ORANGE, NEW JERSEY, ASSIGNOR TO WESTERN ELECTRIC COMPANY, OF NEW YORK, N. Y., A CORPORATION OF ILLINOIS.

THERMIONIC DETECTOR.

1,128,280.  Specification of Letters Patent.  Patented Feb. 16, 1915.

Application filed June 8, 1914. Serial No. 843,807.

*To all whom it may concern:*

Be it known that I, HAROLD DE FOREST ARNOLD, a citizen of the United States, residing at East Orange, in the county of Essex and State of New Jersey, have invented certain new and useful Improvements in Thermionic Detectors, of which the following is a full, clear, concise, and exact description.

This invention relates to thermionic detectors for rectifying and amplifying alternating currents, and particularly feeble electrical oscillations, and its object is to increase the efficiency of such devices.

With the audion, which is a typical thermionic device extremely sensitive to feeble currents, it is usual when applying it to wireless telegraphy to connect the input electrode or grid directly or indirectly to the antenna, and the output electrode or plate directly or indirectly to a receiving instrument. In such use of the audion, local input and output circuits are ordinarily provided, and there is normally flowing across the space between the heated cathode or filament and the output electrode a considerable current, which is induced by a battery or other direct current source in the local output circuit.

According to this invention, there is provided a thermionic detector, preferably of the audion type, having a pair of input electrodes similarly connected to the negative pole of a source of current in the local input circuit and oppositely connected to the source of current to be detected. By connecting the input electrodes to the negative pole of the source of current, which may be small, in this input circuit, and by initially adjusting the potentials of this source and of the source of current in the output circuit, so that only a small current is normally flowing to the plate, the operation of the audion when feeble electrical impulses are received, is such that the successive impulses, positive and negative, of the alternating current waves, are alternately but cumulatively rendered effective to produce in the output circuit a unidirectional current of enormously greater energy than that consumed from the alternating current received.

The audion structure which has been found best adapted for the purposes of this invention is one in which the heated cathode or filament has two separated parts or arms, midway between which is the output electrode or plate, and adjacent to each of which is one of the input electrodes or grids. Preferably the two input electrodes are connected to opposite terminals of a secondary winding of a transformer, and the negative pole of the input battery is connected to a mid-point in this winding. The primary winding of the transformer is then connected to the line or antenna which receives the alternating current to be detected.

The invention will be more fully understood by reference to the accompanying drawing which illustrates the structure and circuit of an audion embodying the invention.

The detector comprises a vacuum containing vessel 1 inclosing a cathode or filament of two parts or arms 2 and 2ª, a pair of input electrodes 3 and 3ª, which may be in the form of grids or the like, each preferably closely situated with respect to one of the cathode arms, and a plate 4 symmetrically located or midway between said arms. The input electrodes are preferably situated, as shown, between the filament and plate. The two filament arms 2 and 2ª are electrically connected at their upper ends by the wire 5 and are heated by current from the battery 6. The plate 4 is connected to the positive pole of a battery 7 and the primary winding 8 of a repeating coil 9, the local output circuit being completed by way of the filament arms 2 and 2ª and the spaces between them and the plate 4. The input electrodes 3 and 3ª are connected to opposite terminals of a winding 10 of a repeating coil 11, which thus serves as the source of alternating current to be detected. The midpoint of the winding 10 is connected to the negative pole of a battery 12, which may be small, the local input circuit being completed by way of the filament arms 2 and 2ª, and the spaces, preferably very short, between them and the two input electrodes 3 and 3ª. The input repeating coil 11 has a primary winding 13 for connection to a line or antenna, not shown, and the output repeating coil 9, a secondary winding 14 connected to a receiving device which may be a telephone receiver 15.

The operation is as follows: There exists at the filament arms 2 and 2ª of the cathode, electric fields controlled jointly by the positive output electrode 4 and the negative input electrodes 3 and 3ª. These electrodes have potentials initially so adjusted that only a small current is flowing to the plate. The negative potential of the input electrodes, which are located preferably very close to the cathode arms and between them and the plate, may be small in comparison with the positive potential of the output electrode, which is farther from the cathode arms. Now if the potential of either input electrode becomes more negative, the current from the filament to the plate can do no more than fall to zero, since the unilateral conductivity of the space will not allow a current in the opposite direction. Therefore, the decrement of current in the local output circuit due to this change is very small. If, on the other hand, the potential of the input electrode is negatively diminished, the current to the plate is increased by a considerable amount. Nevertheless, no current except the very small amount possibly admitted by the electrostatic capacity between the input electrodes and filament can flow in the input circuit, and no energy from the source to be detected except the small loss inherent in the transformer 11 is consumed in causing the direct current to flow in the output circuit. This results in energy from the battery 7 becoming available as continuous current in the output circuit so long as either input electrode is less negative than its normal, which condition is practically continuous, due to the opposition connection of the two input electrodes to the source of alternating current 10. In short, an alternating current potential supplied between the input electrodes 3 and 3ª results in direct current in the output circuit. The value of this direct current varies as the strength of alternating potential impressed on the input electrodes, and the energy thus made available in the output circuit is enormously greater than that consumed from the electrical oscillations received.

What is claimed is:

1. In a thermionic detector, the combination with a source of current to be detected and local input and output sources of current, of a pair of input electrodes similarly connected to the negative pole of the local input source of current and oppositely connected to the source of current to be detected.

2. In a thermionic detector, the combination with a source of current to be detected and local input and output sources of current, of a pair of input electrodes similarly connected to the negative pole of the local input source of current and oppositely connected to the source of current to be detected, the potentials of said local sources of current being proportioned to admit of only a small current normally flowing from the local output source of current.

3. In a thermionic detector, the combination with the cathode and a positively-charged output electrode and local circuit therefor, of a pair of negatively-charged input electrodes, the normal potentials of said output and input electrodes being proportioned to admit of only a small current flowing in the local output circuit, and a source of alternating current to which said input electrodes are oppositely connected.

4. In a thermionic detector, the combination of a cathode comprising two parts, an output electrode symmetrically located with respect to said parts, a pair of input electrodes located adjacent said parts respectively, a source of current to be detected, means for producing normally a small negative charge on said input electrodes, and opposite electrical connections between said input electrodes and the said source of current to be detected.

5. In a thermionic detector, the combination of a cathode comprising two parts, an output electrode located midway between said parts, a pair of input electrodes located adjacent said parts respectively, and between said parts and said output electrode, and means for producing normally a small negative charge on said input electrodes.

6. A thermionic detector comprising a cathode of two parts, an output electrode symmetrically located with respect to said parts, a pair of input electrodes located adjacent said parts, means for producing a small negative charge on said input electrodes, and means for producing on said output electrode a positive charge proportioned with respect to the charge on the input electrode to admit of only a small current normally flowing between said cathode and said output electrode.

In witness whereof, I hereunto subscribe my name this 5th day of June A. D., 1914.

HAROLD DE FOREST ARNOLD.

Witnesses:
R. OLSON,
W. FENTON.